United States Patent
Berche et al.

(10) Patent No.: US 7,319,799 B2
(45) Date of Patent: Jan. 15, 2008

(54) METHOD OF RECOGNIZING AND INDEXING DOCUMENTS

(75) Inventors: Stéphane Berche, Paris (FR); Laurent Najman, Paris (FR)

(73) Assignee: Océ-Industries S.A., Creteil Cedex (FR)

( * ) Notice: Subject to any disclaimer, the term of this patent is extended or adjusted under 35 U.S.C. 154(b) by 616 days.

(21) Appl. No.: 09/813,955

(22) Filed: Mar. 22, 2001

(65) Prior Publication Data

US 2001/0033690 A1    Oct. 25, 2001

(30) Foreign Application Priority Data

Mar. 22, 2000 (FR) ................... 00 03639

(51) Int. Cl.
*G06K 9/32* (2006.01)
*G06K 9/34* (2006.01)
*G06K 9/00* (2006.01)
*H04N 1/00* (2006.01)

(52) U.S. Cl. ............ 382/306; 382/173; 382/181; 707/2; 358/403

(58) Field of Classification Search ........ 382/174–181, 382/199, 200, 229, 321
See application file for complete search history.

(56) References Cited

U.S. PATENT DOCUMENTS

| | | | |
|---|---|---|---|
| 5,220,621 A * | 6/1993 | Saitoh | 382/200 |
| 5,815,595 A | 9/1998 | Gugler | |
| 5,822,454 A | 10/1998 | Rangarajan | |
| 5,966,473 A * | 10/1999 | Takahashi et al. | 382/292 |
| 6,621,941 B1 * | 9/2003 | Syeda-Mahmood et al. | 382/306 |

FOREIGN PATENT DOCUMENTS

| | | |
|---|---|---|
| EP | A2851382 | 7/1998 |
| WO | A2-9630860 | 10/1996 |

* cited by examiner

*Primary Examiner*—Bhavesh M Mehta
*Assistant Examiner*—Charles Kim
(74) *Attorney, Agent, or Firm*—Birch, Stewart, Kolasch & Birch, LLP (57) ABSTRACT

A method of recognizing and indexing documents, using a scanner connected to a computer, the method including scanning the documents, then using a pointing device or member of the computer to designate an arbitrary point P in at least one box of the documents, and finally recognizing by OCR the characters in the box so as to store them in a first database connected to the computer to enable documents scanned in this way to be indexed. The designation step comprises a step of searching for and identifying the box of the document containing the point P designated by the user.

17 Claims, 6 Drawing Sheets

| B27 | 05 | AJOUT DIVERS CHANFREINS POUR CAUSE SECURITE | BSA | 16-07-90 |
|---|---|---|---|---|
| 640 | 04 | JS11 js11 devient JS13 js13 changement tolerance sur delourage changement de forme des axes ABDEF et tolerance sur cotes F | VLE | 23-03-90 |
| 520 | 03 | CHANGEMENT FORMES, MODIFS SUR AXE D | VLE | 10-01-90 |
| 426 | 02 | RAJOUTE COTE DE 99 La AXE D DEVIENT 19, DEMI-CREVE DEVIENT Lg 1 RAJOUTE φ5 H9 SUR OBLONGS RAJOUTE PLAQUETTE epr 6 | VLE | 07-11-89 |
| 352 | 01 | CREATION DOSSIER CLASSE B | VLE | 12-10-89 |
| E.C.O. N. | REV. | MODIFICATION | EXECUTED | DATE |

PART NAME :
DESIGNATION : TOP LEFT FLANK

| MATERIAL : 3mm THICK E24 SHEET | WEIGHT (density 1) : g | DRAWING FOR | DATE : 18-SEP-89 |
|---|---|---|---|
| TREATMENT : ZN 10 B | | DRAWING FOR | INDUSTRIALIZ. |
| COLOUR : | | CONSULTATION | DEVELOPMENT |
| GEN. SURF. APPEARANCE : Ra 3,2 | DRAWN BY : JF | DATE 31/07/90 | |
| GENERAL DRAUGHT ANGLE : | FABRICATION OR EXECUTION | | |
| GENERAL LINEAR TOLERANCE : JS13 js13 | Oce Graphics  1 Rue Jean Lemone - 21 Petites Haies - BP 113 94003 CRETEIL CEDEX - FRANCE - Tel (1) 48 98 80 00 | | |
| GENERAL ANGULAR TOLERANCE : | PART NUMBER | REVISION | SCALE | PAGE |
| EDGE/CORNER BREAKS : OUTSIDE : – INSIDE : | 1 2 0 5 5 4 4 1 5 | 0 5 | 1/1 | 1/1 |
| MUST CONFORM TO ENGENEERING SPECIF. | | | | |
| MUST CONFORM TO STANDARDS : | | | | |

METHOD OF RECOGNIZING AND INDEXING DOCUMENTS

FIELD OF THE INVENTION

The present invention relates to the scientific field of recognizing and indexing documents in a database. It provides more particularly apparatus and a corresponding method enabling technical drawings and forms to be indexed by recognizing only some of their elements.

BACKGROUND ART

There are many methods of recognizing documents that are well known. They make use of an initial scanning step followed by a segmentation step in turn followed by an optical character recognition (OCR) step. The segmentation step (subdividing the document) can be applied to the entire document (a conventional "full page") or to part of the document only.

Nevertheless, such a conventional method making it subsequently possible to index the document automatically can be envisaged only if the document to be recognized is not too complex. In addition, it is not applied to technical drawings. In this particular field, only the initial step of scanning is performed, with the steps of segmentation and recognition being replaced by a step that is performed directly by an operator and consisting in manually inputting the particular elements required for indexing the drawing, from one or more zones of the drawing (in practice present in the title block of the drawing).

It will be understood that under such circumstances, this becomes very tedious when it is necessary to index more than a dozen technical drawings, possibly of different types (i.e. with information blocks of different shapes). There thus exists, at present, an unsatisfied need for a method of indexing such drawings on the basis of automatic recognition.

SUMMARY OF THE INVENTION

The invention thus proposes resolving this problem in a manner that is simple and of low cost by implementing a method of recognizing and indexing documents using a scanner connected to a computer, the method including scanning the documents, then using a pointing device or member of the computer to designate an arbitrary point P in at least one box of the documents, and finally recognizing by OCR the characters in the box so as to store them in a first database connected to the computer to enable documents scanned in this way to be indexed. The designation step comprises a step of searching for and identifying the box of the document which contains the point P designated by the user.

Thus, with the method of the invention, manual input as in the background art is restricted to designating determined zones (referred to as "boxes") within which automatic recognition of the elements necessary for indexing a first document of the same type are available. The documents to be recognized and indexed can be, for example, a set of technical drawings or of forms, and they can optionally be of different types.

The step of looking for and identifying the box can be performed by applying a shape search algorithm over a determined zone surrounding the point P as previously designated by the user. This shape search algorithm can be an algorithm based on the Hough transform, or a projection algorithm which counts the number of pixels present in each vertical or horizontal line of the determined search zone and, on the basis of those numbers, examines peaks in X and Y projection profiles to find the horizontal and vertical lines present in the search zone.

Thus, by limiting the area to which the algorithm is applied, its speed of execution can be increased considerably while limiting the number of iterations that are required for recognizing a box of the document.

The scanning step is preferably performed initially for all of the documents to be processed, with the steps of identifying the box and of performing OCR on its content being performed subsequently in succession for each of the documents. Nevertheless, the scanning step could equally well be performed initially for a first document, with the steps of identifying the box and performing OCR on its content then being performed for the same document, and with these three steps then being repeated successively for all of the documents to be processed.

The invention also provides apparatus for recognizing and indexing documents by implementing the above method. Advantageously, the apparatus further comprises a second database connected to the computer for storing data (referred to as characterization data) enabling the box to be subsequently identified automatically without some arbitrary point P of the box being designated beforehand.

The databases can be integrated in the memory of the computer or they can be external thereto. The pointing device or member can be replaced by the keyboard of the computer or by the finger of the user.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other characteristics and advantages of the present invention will become more apparent on reading the following description given by way of non-limiting indication and with reference to the accompanying drawings, in which.

DETAILED DESCRIPTION OF PREFERRED EMBODIMENTS

Figure 1:
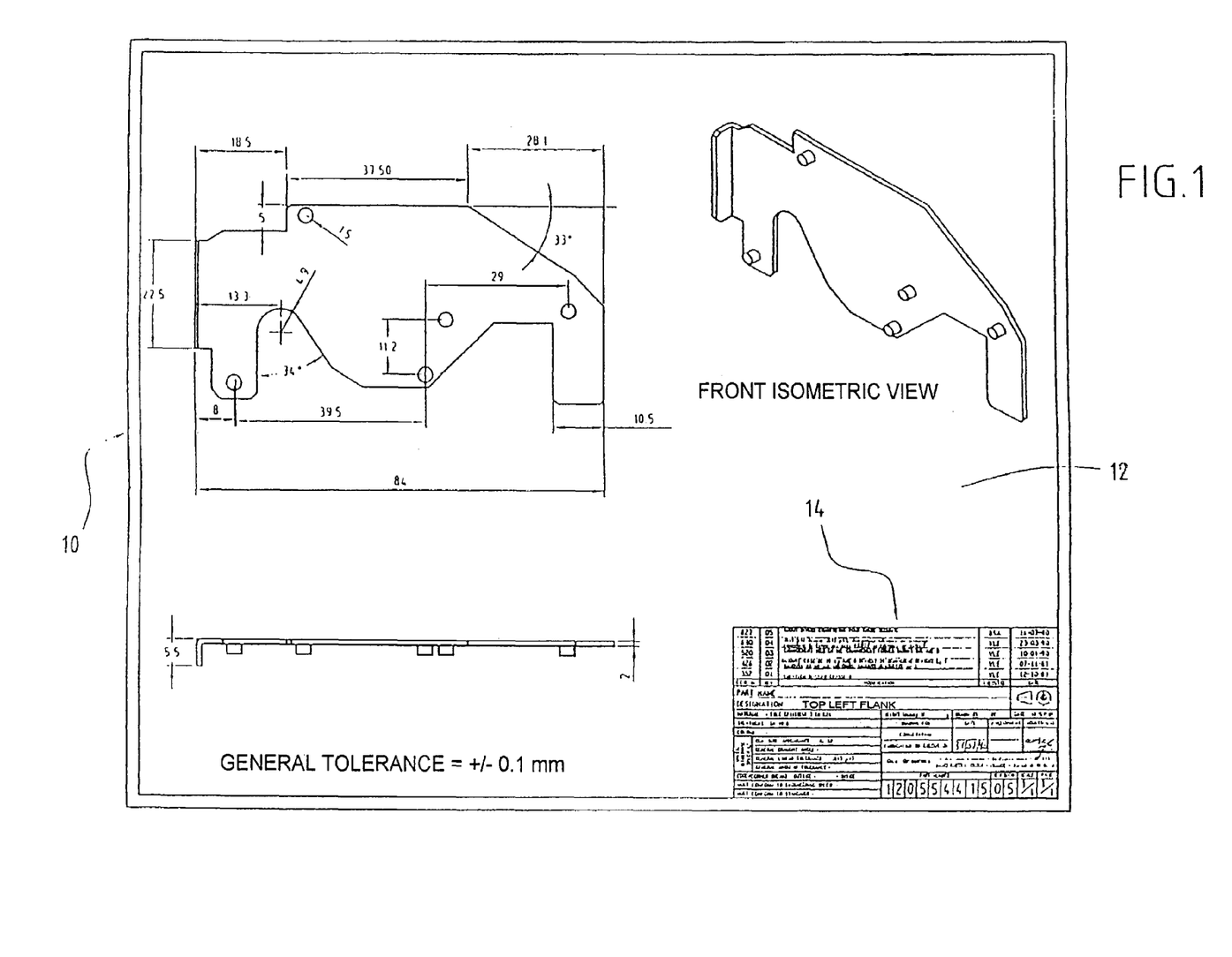
FIG. 1 shows an example of a technical drawing.
Figure 2:
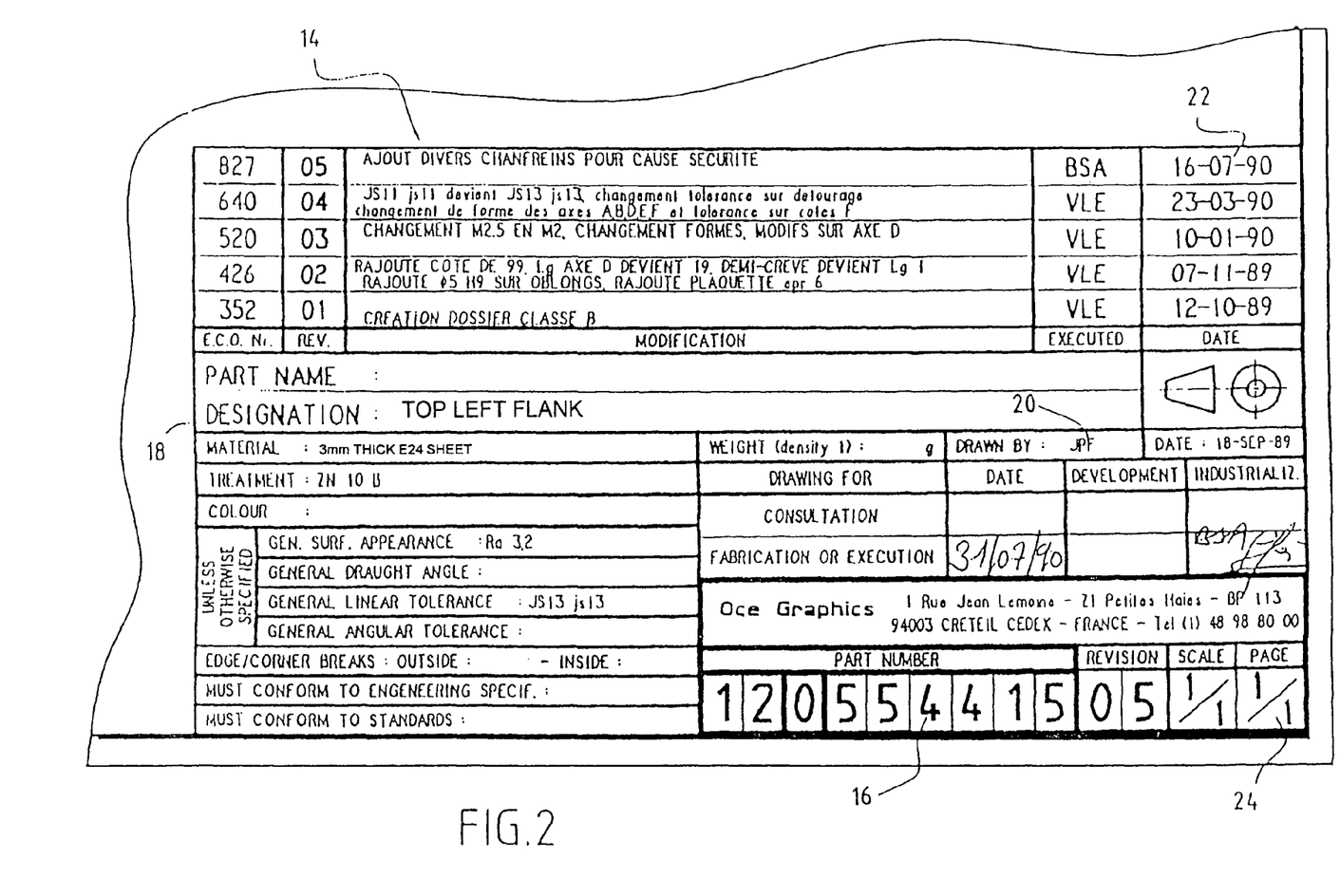
FIG. 2 shows an example of the information block in a drawing of the kind shown in FIG. 1.

As shown in FIGS. 1 and 2, a technical or industrial drawing such as a sheet 10 essentially comprises the drawing itself 12 and an information block 14 made up of a plurality of rectangular boxes of various sizes.

Most of these various boxes contain particular data (i.e., pieces of information) that are not all equally suitable for indexing a technical drawing. This applies, for example, to the data (information) specifying the projection, the scale, or the format of the drawing. Data that are important for indexing include in general at least a first box 16 containing a number identifying the drawing, a second box 18 containing the title of the drawing, and a third box 20 specifying who drew the drawing. Naturally, these three data should not be considered in any way as being limiting, and it is equally possible to envisage also taking account of the date of its most recent update available in a fourth box 22 or its page number which is to be found in a fifth box 24, etc.

Figure 3:
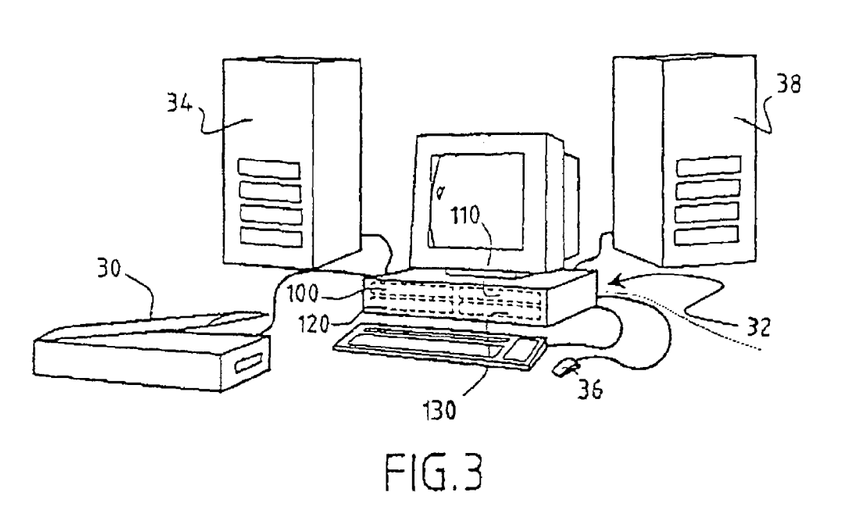
FIG. 3 shows the general structure of the hardware of apparatus for recognizing and indexing documents in accordance with the invention.

FIG. 3 shows hardware architecture that can be included in a computer system that is able to perform the method of the invention for recognizing and indexing documents of the type shown in FIG. 1.

This computer system comprises firstly a digitizer or scanner 30 for scanning documents (specifically drawing sheets) that are subsequently to be indexed. The scanner is connected to a computer or a microcomputer of conventional type 32 provided with conventional software 100 for scanning purposes. A first database 34 also connected to the computer 32 serves to store documents scanned in this way. It will be observed that depending on the internal storage capacity of the computer 32 and the volume of the data corresponding to the documents to be scanned, this first database 34 can either be external, as shown, or else accommodated directly internally inside the computer 32. The computer 32 naturally includes software 110 for controlling this first database 34 (creating it, consulting it, modifying it).

To index documents in the first database 34, provision is made for the computer 32 also to have OCR software 120 of conventional type for recognizing and identifying certain particular elements of these documents. Nevertheless, such OCR software 120 is controlled by specific software 130 in association with a second database 38 containing characterization data, enabling these documents to be processed in particularly simple and fast manner.

In the invention, this recognition is performed only within determined zones of the documents, and more particularly for a technical drawing, only in boxes of its information block that have been located by the user using a pointer device or member 36 of the computer such as a mouse, a track ball, or any other equivalent device (including the user's own finger if a touch-sensitive screen is used), enabling any arbitrary point P within the box to be designated. In addition, after the designation operation has been performed, and in order to further improve processing, the software 130 can optionally ask the user to define the type of data that is to be recognized in the box that has been designated, for example a string of numerical characters (for the identification number) or a string of alphanumerical characters (for the title or the name of the author, for example).

Figure 4:
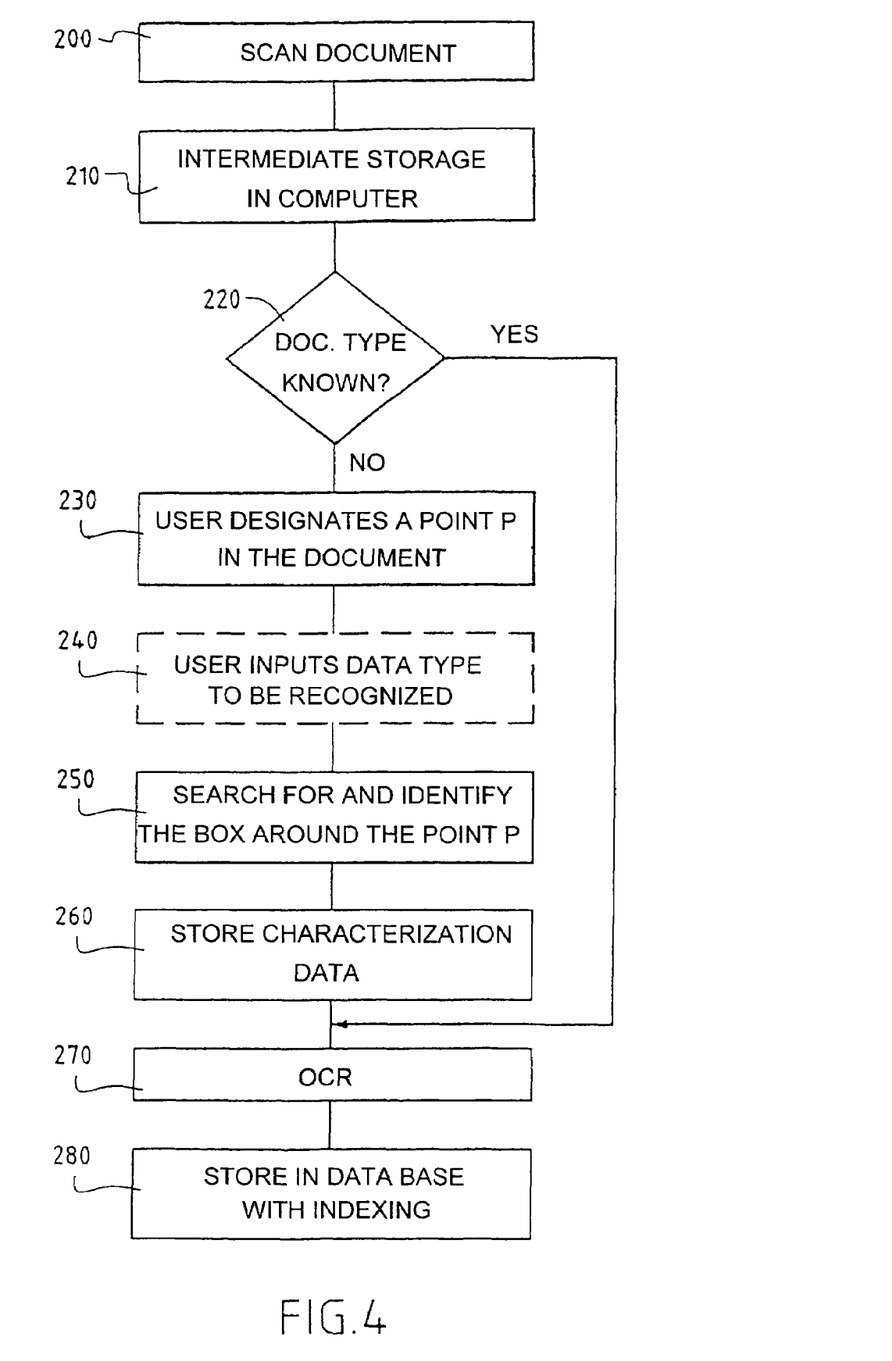
FIG. 4 is a flow chart explaining the operation of the FIG. 3 apparatus when recognizing and indexing the drawing of FIG. 1.

The method implemented in the above apparatus is illustrated in FIG. 4 and thus follows the following steps. After a first document has been scanned in a first step 200 by the scanner 30 associated with the software 100, the image of the document is stored temporarily in a second step 210 in the memory of the computer 32 and possibly simultaneously it is displayed on the display screen of the computer (when necessary after performing a magnification or "zoom" operation). If the processing software 130 cannot identify the type of document that has been scanned on the basis of the data from the characterization database 38 (test in step 220), then this identification is performed during the following steps of the process, and in particular a step 230 is performed initially using the pointing member 36 associated with its software 130 whereby the user designates a point P in a first predetermined zone of the document, e.g. the box 16 in the information block 14 of the drawing that contains the identification number of the drawing. Optionally, and as shown in dashed lines in step 240, the user can then specify the type of character to be recognized in this box. This indication can serve to restrict the choice of characters to be recognized (e.g. only the digits 0 to 9), thereby improving the subsequent OCR step. Once this point has been designated (with its coordinates then being determined relative to a predetermined origin point), a new step 250 is performed in which the box containing the point P is searched for and identified (i.e. the boundary lines of the box are searched for and identified as explained in greater detail with reference to FIG. 5), and once the box has been identified (e.g. with the outline of the box being displayed at increased brightness or in another color) its characterization elements are stored in the second database 38 in a step 260 (the dimensions of the box and the position of its center are also stored), and in the immediately following step 270 OCR is performed conventionally on the characters in the box using conventional software means 120, with the end of this recognition operation being marked by the computer returning control to the user, for example.

The above five steps 230, optional 240, 250, 260, and 270 are then repeated for a second determined zone, and then another, until the document has been fully identified, i.e. until the software 110 has taken account of all of the zones necessary for indexing the document as previously determined depending on the use that is to be made thereof. Once this operation has been performed, a new step 280 is performed in which the scanned image and the OCR recognized character are stored in the first database 34. All of the preceding steps are optionally repeated for a second type of document, and so on until there are no more documents to be scanned and indexed. Thereafter, the first database 34 can be consulted by the software 110 which can serve conventionally to give access to each of the documents in the database as a function of criteria selected by a user and corresponding to one or more of the initially indicated indexing elements.

An important point is that the above designation operations are performed only when indexing a first document of a given type. If the following documents for processing are of the same type, then the test in step 220 obtains a "yes" answer and there is no longer any need to point at the same zones carrying the various items required for indexing. Since the software 130 can store the coordinates of the boxes in the characterization database 38 once they are initially designated, it then suffices merely to search for the same boxes in the following documents starting from the origin point (with resemblance being tested over the area of the box and with a certain amount of tolerance as explained with reference to FIG. 5), and once each box has been identified, the content thereof is analyzed automatically by OCR without any prior designation of any point whatsoever in the boxes.

It will thus readily be understood that the method of the invention is particularly fast and effective since for a set of similar documents, once a given type of document has been identified for the first time during which user intervention is indispensible, the following documents can continue to be identified automatically without the user taking any further action. On each occasion, OCR is applied only to those elements that are necessary for indexing the documents and not on the entire document as has been the case in the background art.

It will also be observed that "one by one" scanning as described above (one document after another) can be replaced by scanning a batch or by scanning all of a set of documents to be processed (i.e. automatically and storing the corresponding scanned images in the computer), with the identification and OCR steps being performed subsequently on each of the documents in the set in succession after the initial scanning operation has been completed.

Figure 5:
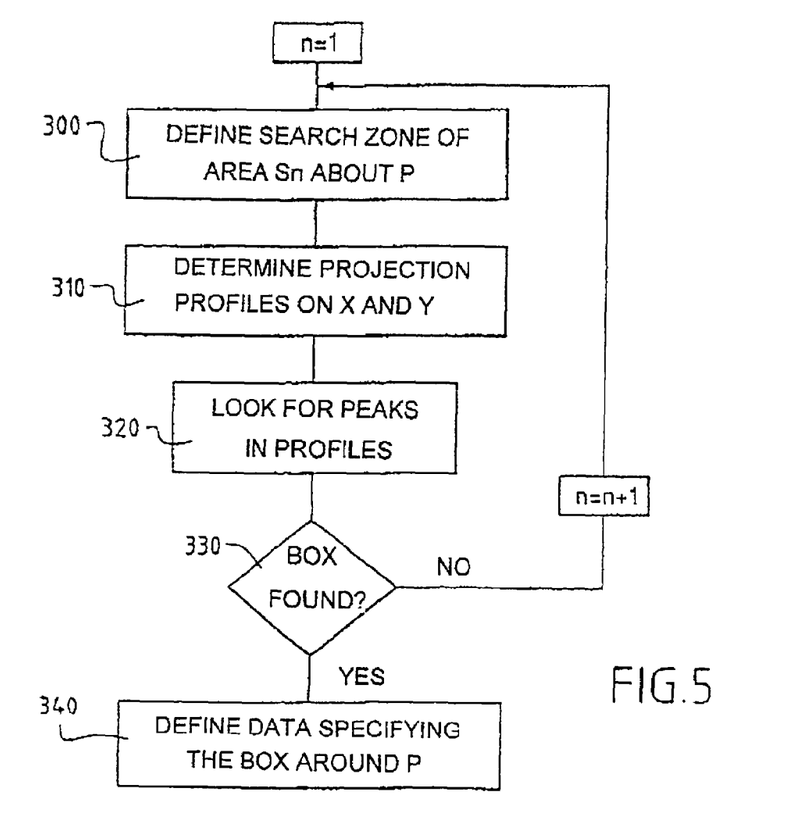
FIG. 5 is a flow chart showing greater detail of the function for searching and identifying a box in the block of FIG. 2.

FIG. 5 shows the various operations performed by the search subprogram implemented in the software 130 for identifying a box as determined solely by the user designating a point P in the box. These operations are based on applying a shape search algorithm such as a projection algorithm or a Hough transform (for round shapes). Specifically, a particular application of a conventional projection algorithm is performed which includes counting the number of pixels present in each vertical and horizontal line of an image, and on the basis of these count numbers, in finding the horizontal and vertical lines in the image of the box by X and Y projection profiles (where the lines are determined by the peaks in said projection profiles). This algorithm has the advantage of providing a very high signal-to-noise ratio since the presence of any "hole" in a line (i.e. a mixing pixel) has little effect on the height of the peak, and similarly if the line slopes somewhat it has little effect on the position of the peak.

Figure 8A:
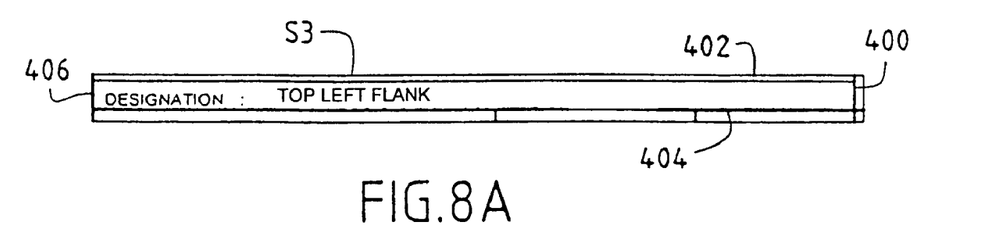
FIG. 8A shows a third search zone that fully contains the box to be identified.

Nevertheless, in the invention, this projection algorithm is not applied to the entire document but only to a determined zone thereof (of area Si defined in a first step 300) that is defined around the point P designated during the pointing step 220. Thus, assuming that this search zone contains the box to be recognized in full, it suffices merely to project (step 310) all of the vertical lines to the right of the point P in order to find the right side of the box (it will be where the peak (step 320) is greatest or greater than a given threshold). The same is done with the vertical lines on the left of the point for the left side of the box and with the horizontal lines above and below the point to find respectively the top and bottom sides of the box (iteration via step 330). Nevertheless, in practice, this initial search zone will either lie within the box to be identified or it will overlap it (see for example area S1 in FIG. 6A), so it is therefore appropriate to increase the area of this zone progressively (in successive determined steps) until it covers the box completely, thereby enabling it to be identified (see area S3 in FIG. 8A). On each occasion, the projection algorithm (step 310) is applied. Identification comes to an end (test in step 330) when for two successive areas the positions of the projection peaks determined in the preceding step 320 remain the same. The coordinates of the box that has been found are then stored in a following step 340 so as to be used subsequently for automatic recognition of the following documents. An example of an implementation of the algorithm is shown with reference to FIGS. 6A to 8C which show the process implemented for identifying the box 18 that contains information for indexing, by way of example.

Figure 6A:
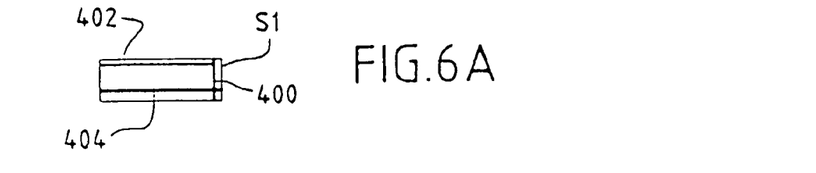
FIG. 6A shows a first search zone incorporating a portion of the box to be identified.
Figure 6B:
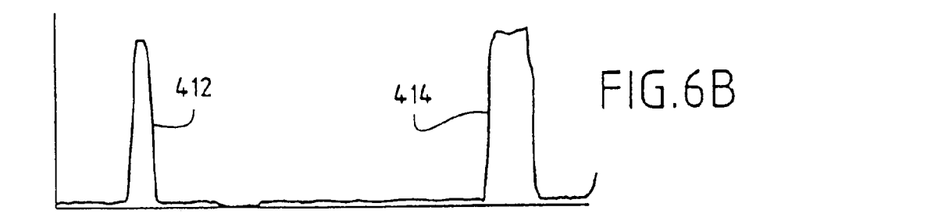
FIGS. 6B and 6C are projection profiles obtained from the search zone of FIG. 6A.
Figure 6C:
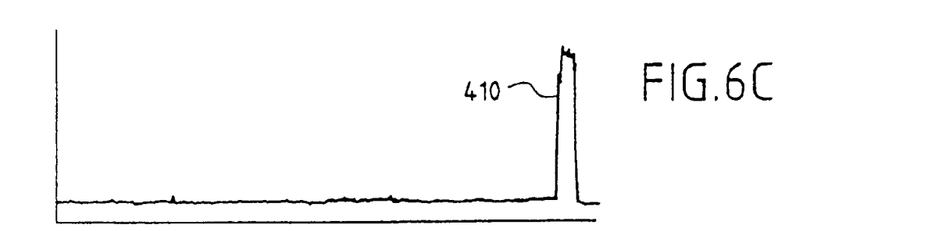
Figure 7A:
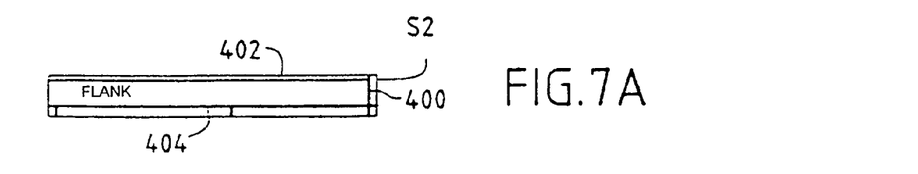
FIG. 7A shows a second search zone incorporating a larger portion of the box to be identified.
Figure 7B:
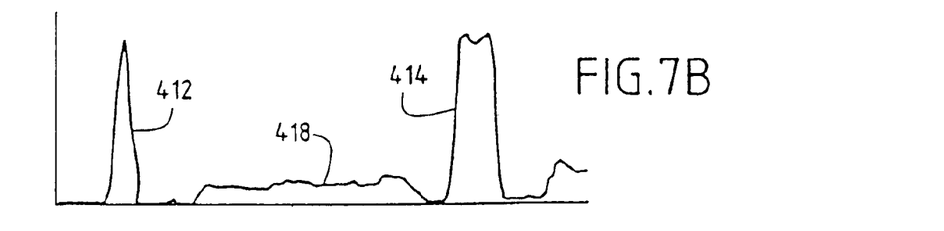
FIGS. 7B and 7C are projection profiles obtained from the search zone of FIG. 7A.
Figure 7C:
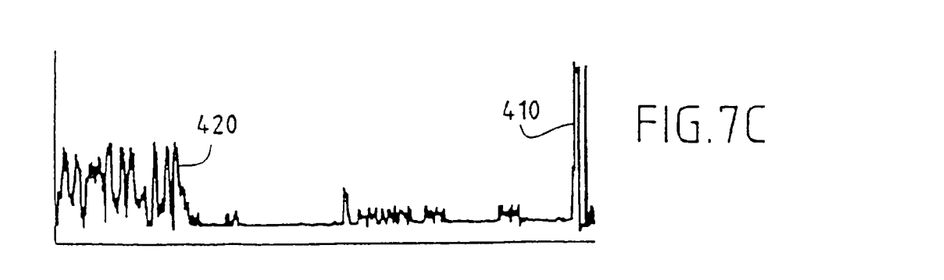
Figure 8B:
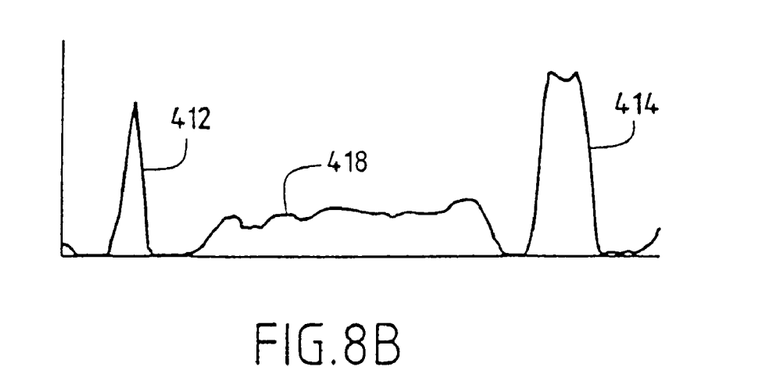
FIGS. 8B and 8C are projection profiles obtained from the search zone of FIG. 8A.
Figure 8C:
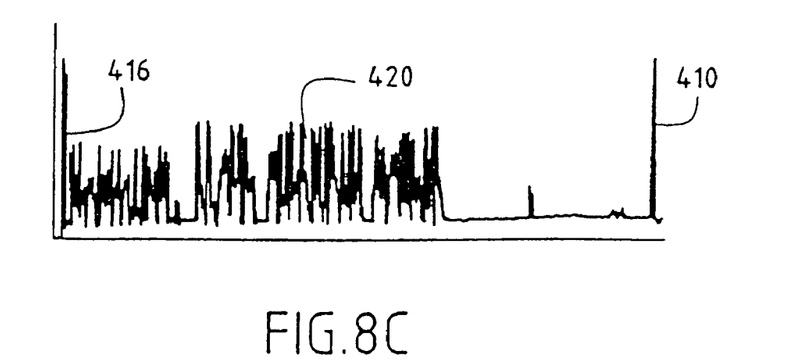

In the example, it is assumed that the user has clicked on the extreme lower right of the drawing 12 of FIG. 1, namely the box 14 of FIGS. 1-2, in particular box 18. The software 130 then can create a first rectangular search zone of area S1 around this point, as shown in FIG. 6A, which zone contains a right vertical side 400 and top and bottom portions 402 and 404 of the box to be identified. Applying the projection algorithm to this first search zone leads to the horizontal and vertical projections of FIGS. 6B and 6C. FIG. 6B clearly shows two peaks 412 and 414 corresponding to the respective horizontal sides 402 and 404, and FIG. 6C shows a single peak 410 corresponding to the vertical side 400. This initial analysis does not enable the box 18 to be analyzed, so a second search zone of area S2 is then examined automatically, and as shown in FIG. 7A this area still contains the right vertical side 400 and portions, albeit longer portions, of the two horizontal sides 402, 404. The results of the horizontal and vertical projection algorithms are shown in FIGS. 7B and 7C. There can be seen the peaks 410, 412, 414 together with other peaks 418 and 420 which are more or less pronounced depending on how much of the data (information) "FLANK" appears in the horizontal projection and in the vertical projection. Finally, since this second application of the algorithm still does not enable the box 18 to be identified completely, a third search zone of area S3 is defined automatically which this time covers the entire box 18 (see FIG. 8A), and in particular covers its horizontal side 402 and 404 in full together with its left vertical side 406. The horizontal projection that results from the corresponding algorithm is shown in FIG. 8B which has two peaks 412 and 414 corresponding to the two horizontal sides 402 and 404. However, the vertical projection now shows up, in addition to the series of peaks 420, not only the peak 410 corresponding to the right side 400 of the box 18, but also a new peak 416 corresponding to the left side 406 of the box, thus enabling the box 18 to be identified in full.

It is important to observe that although the method and the apparatus of the invention are described essentially in terms of recognizing and indexing technical drawings, it is naturally quite possible to envisage implementing the method for other types of documents, and in particular a most advantageous application lies in recognizing and indexing forms, e.g. of the order type (in particular for mail order) or indeed operations sheets. At present, processing such forms requires them to be characterized in advance by way of special symbols located at special locations on the forms, which symbols then enable the type of the form to be identified automatically. Under such circumstances, characterizing a form is a process that is lengthy and complex and can only be justified when a large quantity of similar documents need scanning.

With the present invention, this stage of prior characterization disappears and is replaced by a step of designating/identifying only those boxes of the form that are to be processed.

Thus, the method of identification is particularly fast (which is important when only a few technical drawings or forms are to be processed), simple, and can be performed by any operator even if not highly qualified. Furthermore, it is stable against any input noise that might result from the scanned documents being moved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of recognizing and indexing documents in a system having a scanner connected to a computer, the method comprising:

scanning a document;

designating, by a user, an arbitrary point P in at least one box of the scanned document using a pointing device or member of the computer, wherein no extracting or analyzing process takes place previous to the user's designation;

searching for and identifying said box by applying a shape search algorithm over a determined search zone surrounding said point P previously designated by the user, wherein if the determined search zone does not include the entire box, using at least one additional search zone of increasing size until the entire box is within the search zone;

recognizing by OCR the characters in said identified box of the scanned document;

storing the recognized characters in a first database connected to the computer to enable documents scanned in this way to be indexed; and storing, in a second database connected to the computer, characterization data of said box of the scanned document, such that another box subsequently can be identified automatically without any point P within said another box being designated, for next documents of a same type.

2. The method according to claim 1, wherein said shape search algorithm is a projection algorithm which counts the number of pixels present in each vertical or horizontal line of said determined search zone and which, on the basis of these count numbers, finds the horizontal and vertical lines present in said search zone by examining the peaks in the X and Y projection profiles.

3. The method according to claim 1, wherein said shape search algorithm is an algorithm based on the Hough transform.

4. The method according to claim 1, wherein said OCR step is preceded by a step in which a user defines the type of character to be recognized in said box of the scanned document.

5. The method according to claim 1, wherein said scanning step is performed initially for a set of documents to be processed, with said steps of identifying the box and performing OCR being performed subsequently in succession for each of the documents.

6. The method according to claim 1, wherein said scanning step is initially performed for a first document, with said steps of identifying the box and performing OCR subsequently being performed on that document so as to define a sequence, with said sequence then being repeated in succession for each of the documents to be processed.

7. The method according to claim 1, wherein said documents to be recognized and indexed are a set of technical drawings of the same or different types.

8. The method according to claim 1, wherein said documents to be recognized and indexed are a set of forms, of the same or different types.

9. An apparatus for recognizing and indexing documents, the apparatus comprising:

a scanner for scanning a document and delivering an image of the scanned document;

a computer connected to the scanner to receive said scanned image;

a first database connected to said computer for storing said scanned image;

first software for using a pointing member to designate, by a user, an arbitrary point P in at least one box of the scanned image, wherein no extracting or analyzing process takes place previous to the user's designation, for searching for and identifing the box containing said point P designated by the user, for recognizing by OCR the characters in said box of the scanned image, and for storing the recognized characters so as to enable images scanned in this way to be indexed, wherein the searching for and identifying said box is performed by applying a shape search algorithm over a determined search zone surrounding said point P previously designated by the user, wherein if the determined search zone does not include the entire box, using at least one additional search zone of increasing size until the entire box is within the search zone;

a second database connected to the computer to store characterization data of said box of the scanned image, such that another box subsequently can be identified automatically by said first software without any point P within said another box being designated, for next documents of a same type.

10. The apparatus according to claim 9, further comprising second software for defining the type of data to be recognized in said box of the scanned image.

11. The apparatus according to claim 9, wherein the first and second databases are integrated in a memory of the computer.

12. The apparatus according to claim 9, wherein said pointing member includes a keyboard of the computer or a finger of the user.

13. A computer-readable medium having embodied thereon software to be processed by a computer connected so as to receive a scanned image, the software being operable to cause said computer to perform the functions of the first software of claim 9.

14. The apparatus of claim 9, wherein the first software includes a shape search algorithm.

15. The apparatus of claim 9, wherein the first software includes a projection algorithm for counting the number of pixel present in each vertical or horizontal line of a determined search zone surrounding said previously designated point P.

16. The apparatus of claim 15, wherein the projection algorithm locates, based on the counted numbers, the horizontal or vertical lines present in the search zone by analyzing peaks in X or Y projection profiles.

17. A method of recognizing and indexing documents in a system having a scanner connected to a computer, the method comprising:

scanning a document;

manually designating, by a user an arbitrary point P in a predetermined area of the scanned document, if a type of the scanned document is not known, wherein no extracting or analyzing process takes place previous to the user's designation;

searching for and identifying a box around the arbitrary point P of the scanned document by applying a shape search algorithm over a determined search zone surrounding the arbitrary point P designated by the user, wherein if the determined search zone does not include the entire box, using at least one additional search zone of increasing size until the entire box is within the search zone;

storing, in a database connected to the computer, characterization data of the identified box of the scanned document, such that boxes in next documents of a same type can be identified automatically without designation of an arbitrary point P on the next documents;

recognizing characters in the identified box of the scanned document; and storing the recognized characters to index the scanned document.

* * * * *